US008561960B2

(12) United States Patent
Sinclair

(10) Patent No.: US 8,561,960 B2
(45) Date of Patent: Oct. 22, 2013

(54) CANOPY MOUNTING APPARATUS

(76) Inventor: Garland Sinclair, Fayetteville, NC (US)

( * ) Notice: Subject to any disclaimer, the term of this patent is extended or adjusted under 35 U.S.C. 154(b) by 0 days.

(21) Appl. No.: 13/357,250

(22) Filed: Jan. 24, 2012

(65) Prior Publication Data
US 2013/0187016 A1 Jul. 25, 2013

(51) Int. Cl.
F16M 13/00 (2006.01)
A01K 97/10 (2006.01)
A47G 25/12 (2006.01)
B65D 90/12 (2006.01)
E04H 15/06 (2006.01)
B60R 7/00 (2006.01)

(52) U.S. Cl.
USPC ........... 248/518; 248/534; 220/628; 220/478; 135/88.08; 224/410

(58) Field of Classification Search
USPC .................. 248/682, 518, 519, 523, 534; 135/88.08; 296/37.1, 107.08, 107.01; 280/32.5, 762, 770; 220/475, 629, 628, 220/635, 890, 478, 480; 62/331, 459, 62/457.7; 224/509, 282, 521, 529, 401, 224/410, 488, 495, 502
See application file for complete search history.

(56) References Cited

U.S. PATENT DOCUMENTS 3,687,344 A * 8/1972 Nixon ............................ 224/519
4,558,807 A * 12/1985 Jackson ........................ 224/251
4,927,200 A * 5/1990 Wilkins ........................ 296/37.8
5,232,005 A 8/1993 Mitchell
5,269,157 A * 12/1993 Ciminelli et al. ............. 62/457.7
5,275,018 A * 1/1994 Lin et al. ....................... 62/457.7
5,396,915 A 3/1995 Bomar
5,439,151 A * 8/1995 Clayton ........................ 224/509
5,950,617 A * 9/1999 Lorenz .......................... 126/276
6,105,594 A 8/2000 Diaz
6,425,510 B1 * 7/2002 King ............................. 224/401
6,502,885 B1 * 1/2003 Gammon et al. ........... 296/37.13
6,536,733 B1 * 3/2003 Sharp ............................ 248/519
6,659,566 B2 * 12/2003 Bombardier ................ 298/22 R
7,143,601 B1 * 12/2006 Jimenez ....................... 62/457.7
7,188,889 B2 * 3/2007 Wagner et al. ................ 296/163
7,389,608 B1 * 6/2008 MacKay ............................ 43/57
7,819,128 B2 10/2010 Clark et al.
8,123,190 B2 * 2/2012 Kost .............................. 248/514
2006/0156600 A1 7/2006 Barker
2007/0039638 A1 * 2/2007 Johnson et al. ................. 135/16

* cited by examiner

Primary Examiner — Jonathan Liu
Assistant Examiner — Guang H Guan
(74) Attorney, Agent, or Firm — Dale J. Ream

(57) ABSTRACT

A canopy mounting apparatus for use with a lawn tractor includes a housing having a bottom wall and side walls extending upwardly from the bottom wall to define an interior area and an open top. The upstanding walls include opposed front and rear walls with opposed side walls connecting the front and rear walls. The housing rear wall is coupled to the lawn tractor rear framework. A support arm includes a first end pivotally coupled to the housing front wall and a second end releasably coupled to the housing front wall such that the support arm is movable between a stowed configuration when the support arm is coupled to the housing front wall and an extended configuration when the support arm is extended away from the housing front wall. A canopy holding member is coupled to the support arm and includes a configuration complementary to a canopy shaft.

10 Claims, 10 Drawing Sheets

CANOPY MOUNTING APPARATUS

BACKGROUND OF THE INVENTION

This invention relates generally to canopy devices and, more particularly, to a canopy mounting apparatus configured to be mounted to a rear framework of a lawn tractor and that is adjustable to shade a lawn tractor or an area adjacent the lawn tractor from the sun.

Riding a lawn tractor (which may also be referred to as a riding lawn mower) is a task typically performed during the spring, summer, and fall seasons when heat from the sun may be intense and uncomfortable. A rider often seeks to find relief from the sun by wearing cool clothing, wearing sunglasses, or simply by taking a brake by parking under a shade tray. Some users of a riding lawn mower have even tried to hold an umbrella in the air as a shield against the sun's hot rays.

Various devices have been proposed in the art for mounting a canopy over a tractor to shade an operator. Although assumably effective for their intended purposes, the existing devices, the existing devices are an integral part of the lawn tractor, are not movable to selectively shade areas adjacent the lawn tractor, or do not include a housing for storing articles.

Therefore, it would be desirable to have a canopy mounting apparatus configured to be mounted to the rear framework of a lawn tractor and that includes a canopy holding member for extending an umbrella type canopy above the lawn tractor. Further, it would be desirable to have a canopy mounting apparatus that includes a canopy support arm that is adjustable to extend the canopy toward or away from the lawn tractor, as desired. In addition, it would be desirable to have a canopy mounting apparatus that includes a housing having a stowed container that is independently movable apart from the canopy.

SUMMARY OF THE INVENTION

A canopy mounting apparatus for use with a lawn tractor having a rear framework includes a housing having a bottom wall and a plurality of walls extending upwardly from the bottom wall so as to define an interior area and an open top. The plurality of walls includes opposed front and rear walls with opposed side walls connecting the front and rear walls. The housing rear wall is coupled to the lawn tractor rear framework. A support arm includes a first end pivotally coupled to the housing front wall and a second end releasably coupled to the housing front wall such that the support arm is movable between a stowed configuration when the support arm is coupled to the housing front wall and an extended configuration when the support arm is extended away from the housing front wall. A canopy holding member is coupled to the support arm and includes a configuration complementary to a canopy shaft.

The canopy mounting apparatus includes a first bracket having a first portion fixedly mounted to the lawn tractor rear framework and a second portion releasably coupled to the housing rear wall. A second bracket includes a first section fixedly mounted to the lawn tractor rear framework and a section fixedly mounted to the housing rear wall, the second bracket first section pivotally coupled to the bracket second section such that the housing is selectively pivoted away from the lawn tractor rear frame when the first bracket second portion is released from the housing rear wall.

Therefore, a general object of this invention is to provide a canopy mounting apparatus that selectively shades a lawn tractor.

Another object of this invention is to provide a canopy mounting apparatus, as aforesaid, having a canopy support arm that is adjustable to shade the lawn tractor and an area adjacent the lawn tractor.

Still another object of this invention is to provide a canopy mounting apparatus, as aforesaid, that includes a housing configured to hold articles.

Yet another object of this invention is to provide a canopy mounting apparatus, as aforesaid, in which the housing is itself adjustable adjacent to or extended away from the lawn tractor.

A further object of this invention is to provide a canopy mounting apparatus, as aforesaid, that is easy to install and easy to use.

A still further object of this invention is to provide a canopy mounting apparatus, as aforesaid, that is inexpensive to manufacture.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
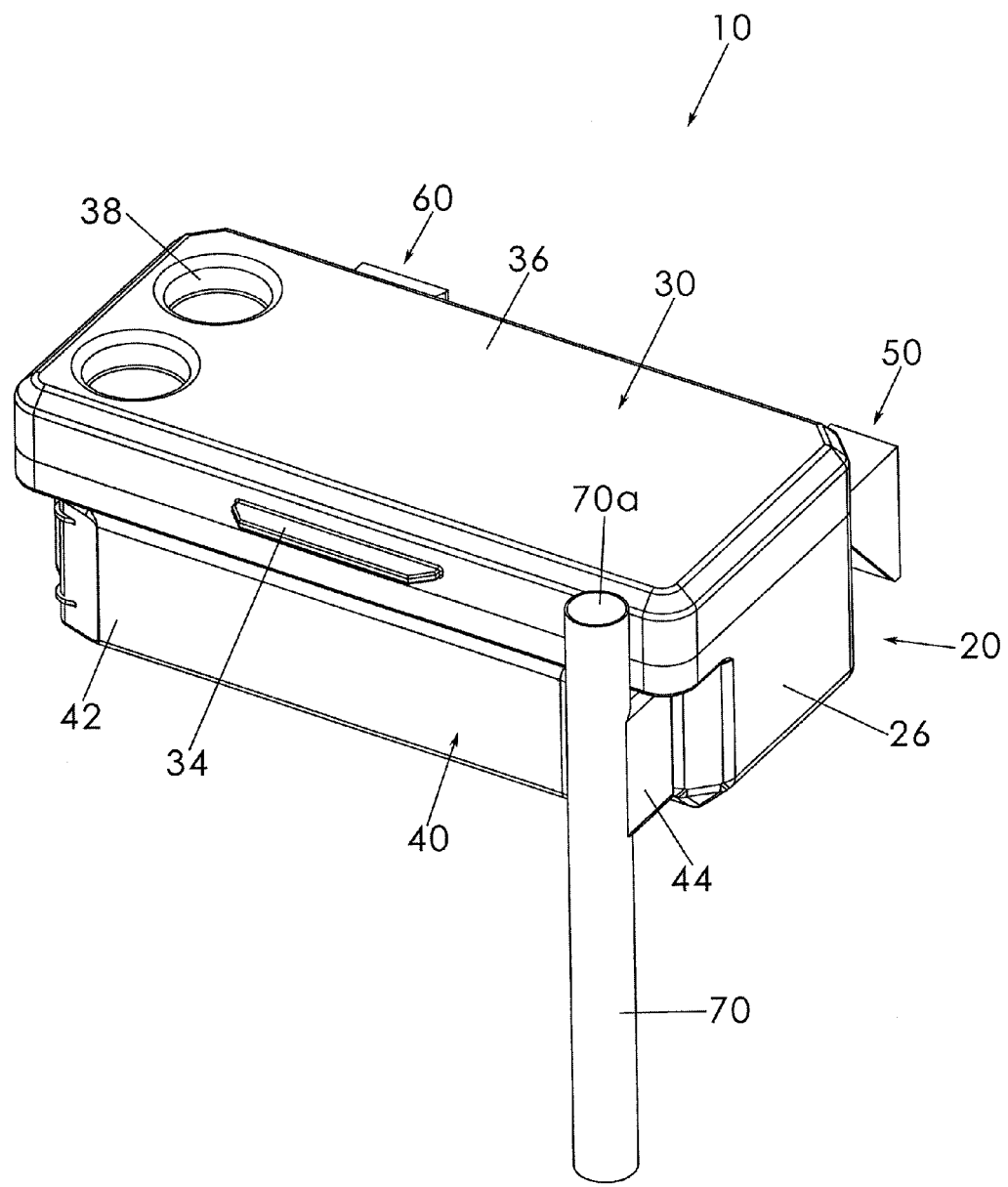
FIG. 1 is a perspective view of a canopy mounting apparatus according to a preferred embodiment of the present invention with the housing lid in a closed configuration and a canopy support arm in a stowed configuration.

A canopy mounting apparatus according to a preferred embodiment of the present invention will now be described in detail with reference to FIGS. 1 to 10 of the accompanying drawings. The canopy mounting apparatus 10 includes a housing 20, a support arm 40 having a canopy support member 70, and first 50 and second 60 mounting brackets.

Figure 2:
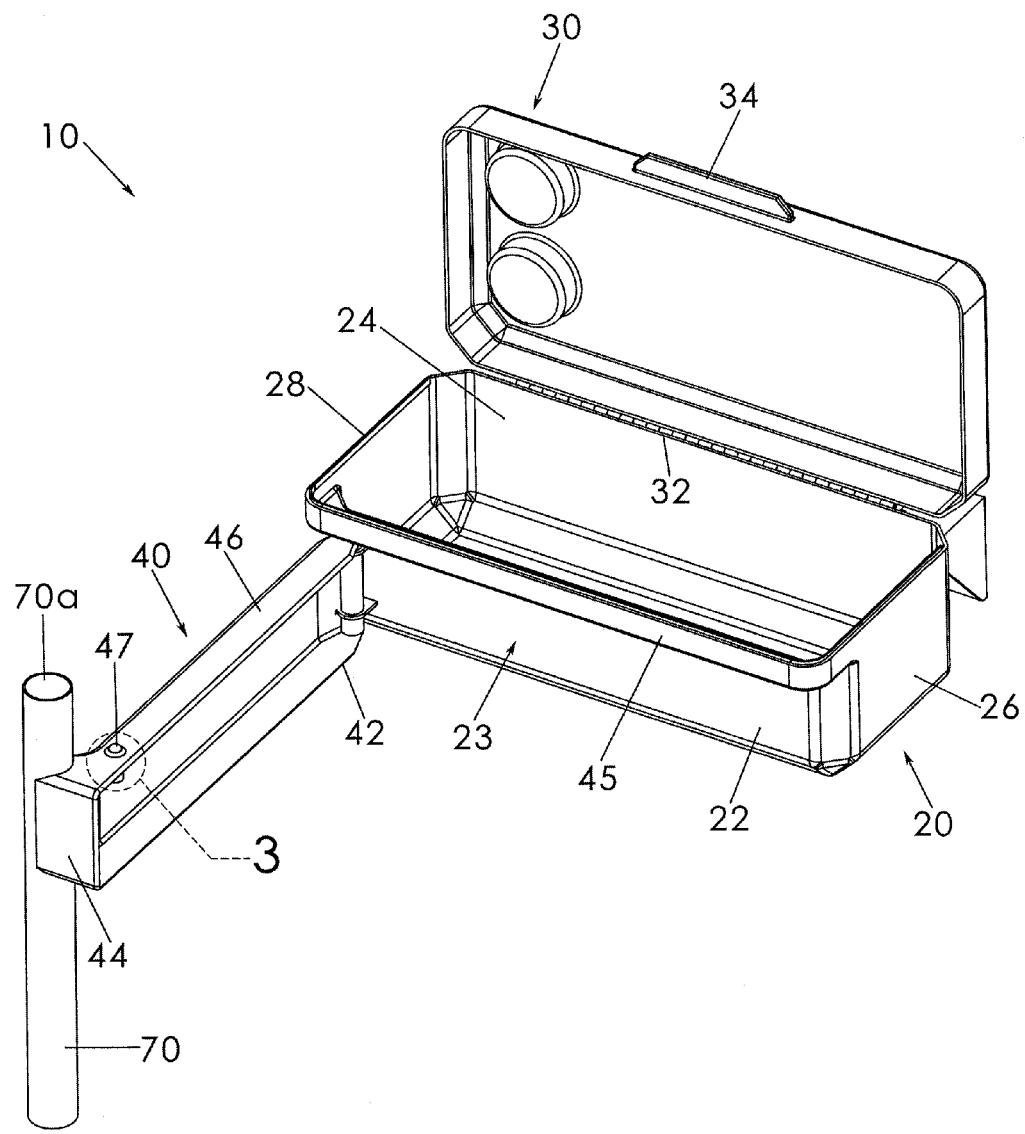
FIG. 2 is another perspective view of the canopy mounting apparatus as in FIG. 1 with the housing lid in an open configuration and a canopy support arm in an extended configuration.
Figure 3:
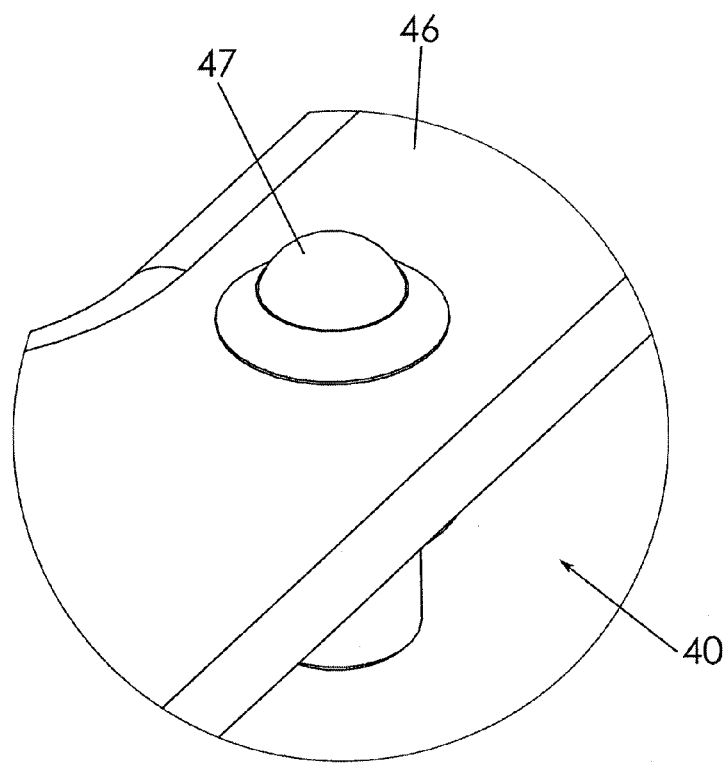
FIG. 3 is an isolated view on an enlarged scale taken from FIG. 2.
Figure 4:
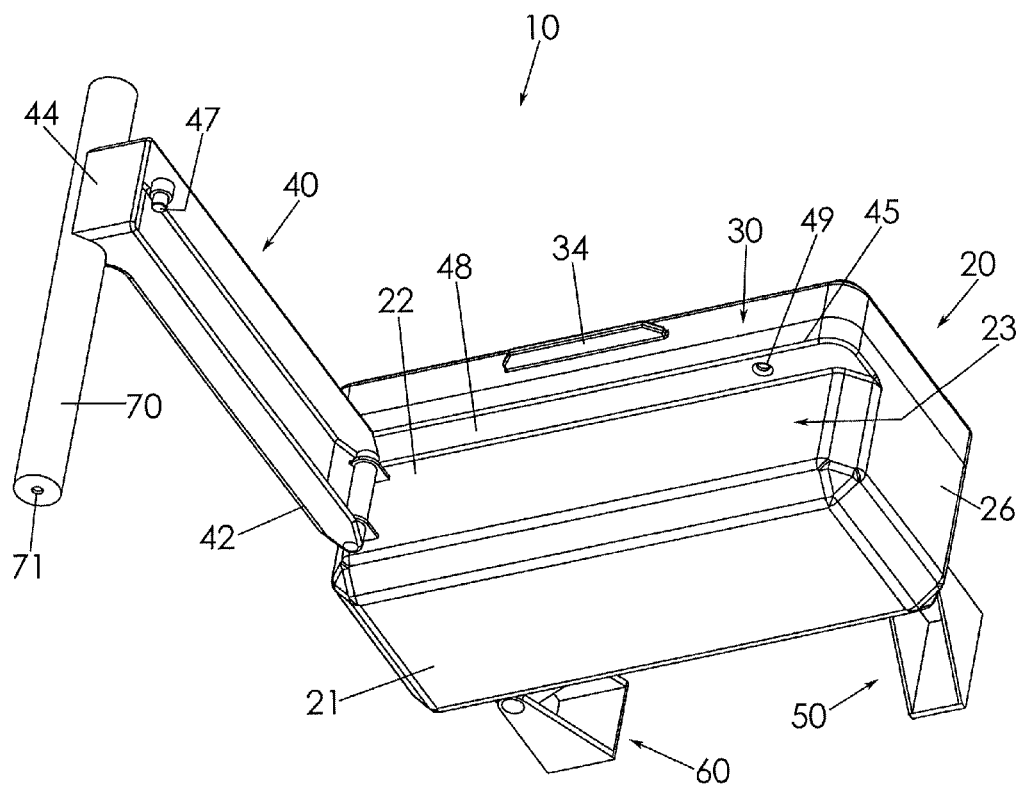
FIG. 4 is a perspective view of the canopy mounting apparatus taken from an angle below the canopy supporting apparatus.
Figure 5:
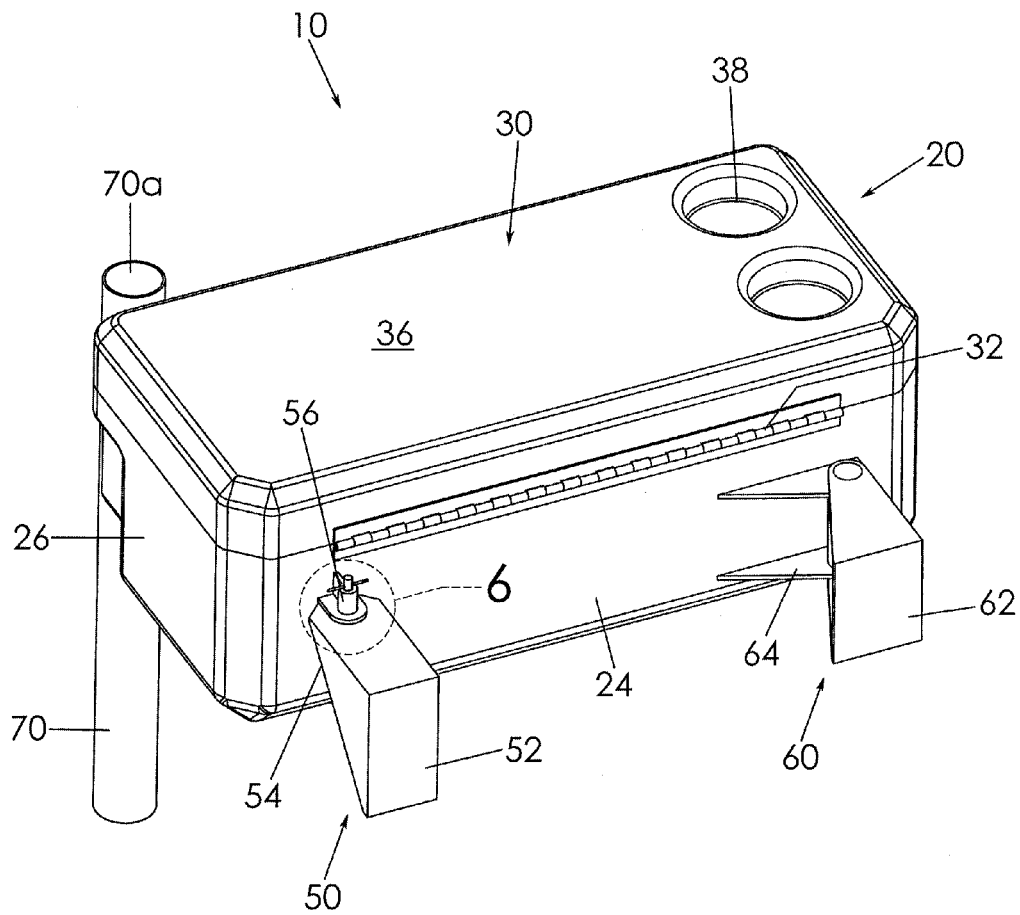
FIG. 5 is a rear perspective view of the canopy mounting apparatus according to the present invention.
Figure 6:
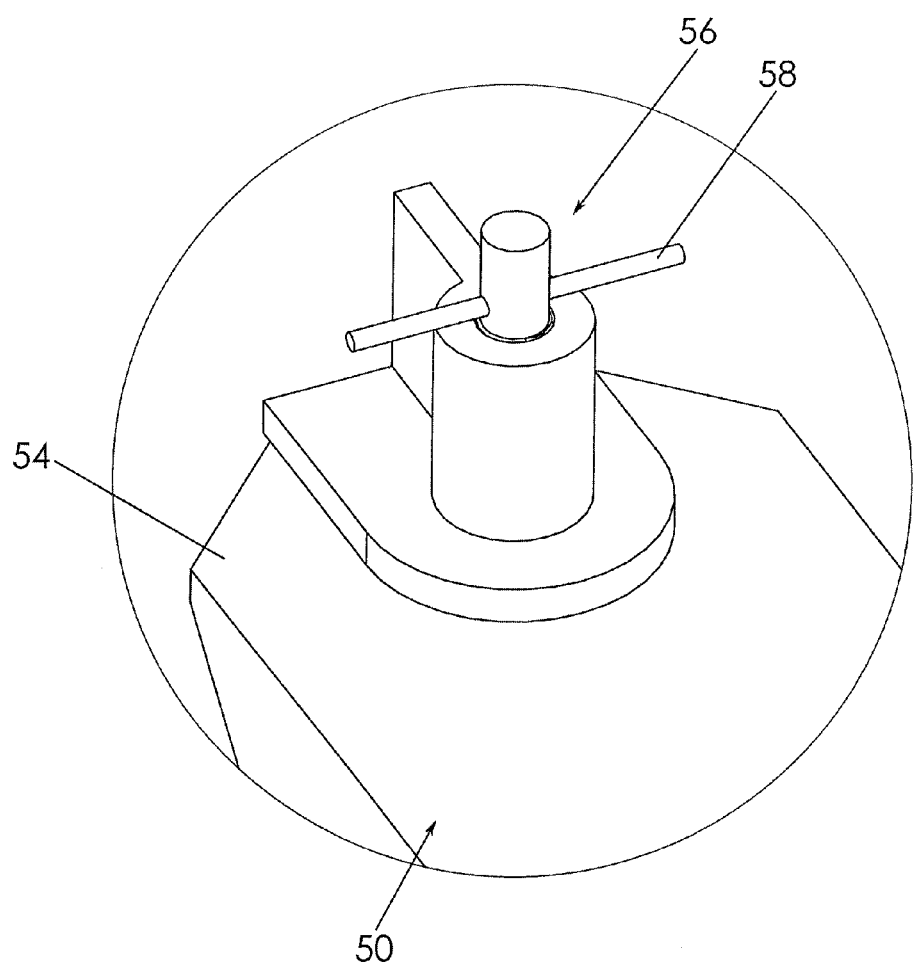
FIG. 6 is an isolated view on an enlarged scale taken from FIG. 5.
Figure 7:
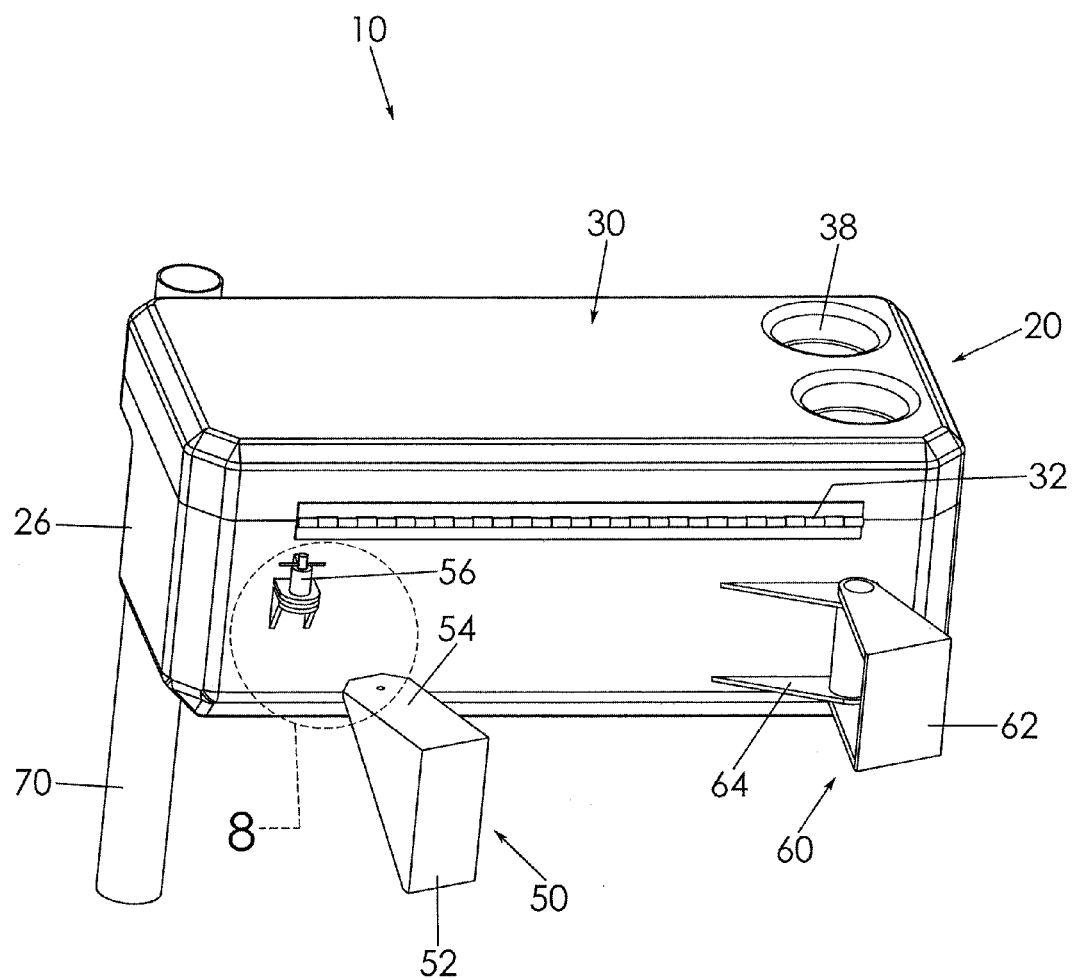
FIG. 7 is another rear perspective view of the canopy mounting apparatus as in FIG. 5 illustrating the housing pivotally moved away from the first bracket.
Figure 8:
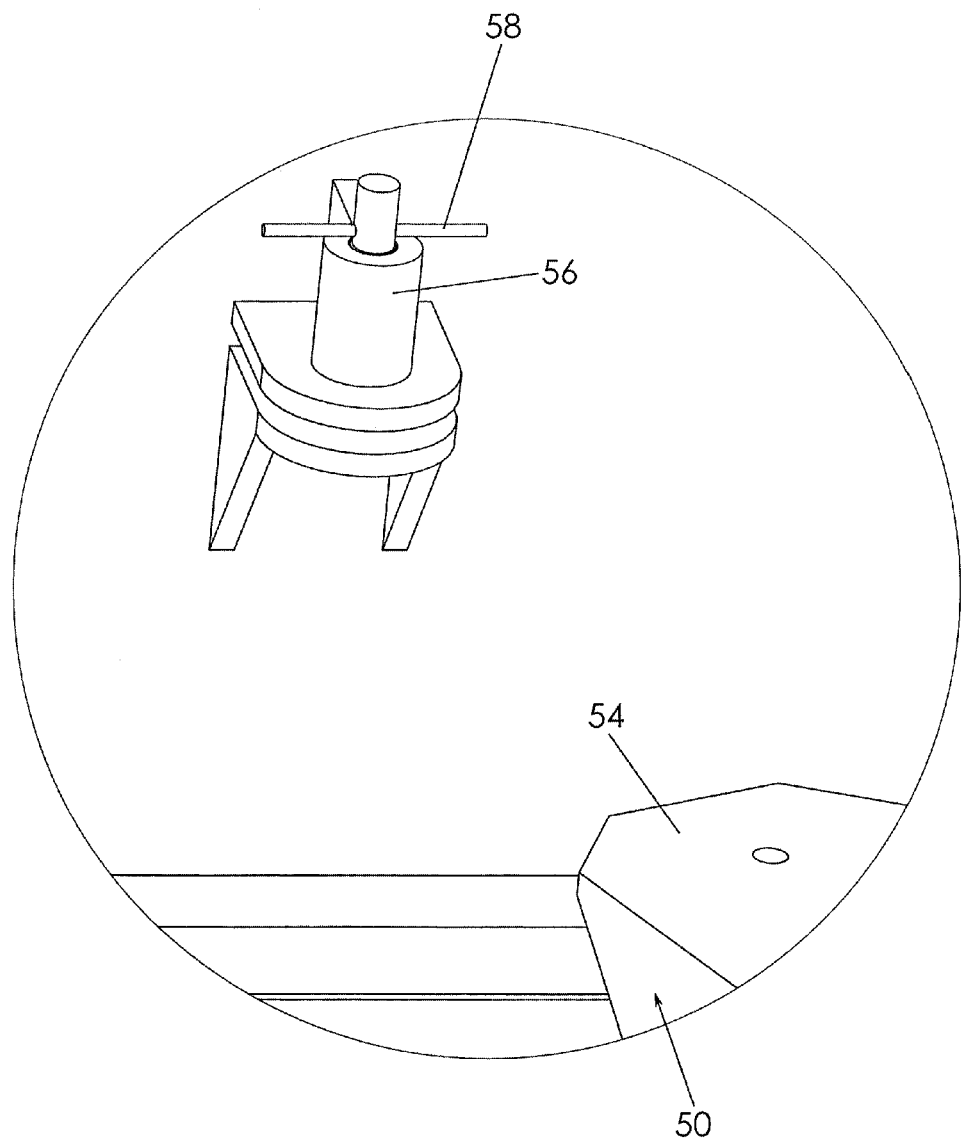
FIG. 8 is an isolated view on an enlarged scale taken from FIG. 5.

The housing includes a bottom wall 21 and a plurality of upstanding wall extending upwardly from the bottom wall 21 so as to define an interior area. The upstanding walls include respective upper edges that together define an open top 28 (FIG. 2). More particularly, the upstanding walls include a front wall 22, and opposed rear wall 24, and side walls 26 connecting the front 22 and rear 24 walls. The rear wall 24 of the housing 20 may be coupled to the rear framework 14 of a lawn tractor 12 as will be described later.

The housing 20 may include a lid 30 pivotally coupled to the upper edge of the rear wall 24 (FIG. 2). The lid 30 is selectively movable, such as by a hinge 32, between an open configuration (FIG. 2) allowing access to the interior area and a closed configuration (FIG. 1) in which access is prevented. The lid 30 may include a handle 34 by which the lid 30 may be urged by a user between the open and closed configurations. The lid 30 may include a top surface 36 that defines one or more cup holder recesses 38, each having a configuration complementary to that of a beverage receptacle such that a cup may be securely inserted therein (FIG. 1).

The canopy mounting apparatus 10 includes a support arm 40 having a first end 42 that is pivotally coupled to one end of the front wall 22 of the housing 20 with a suitable fastener, such as a pin, axle, hinge or the like (FIGS. 1 and 2). The support arm 40 includes a second end 44 opposed from the first end 42 that is releasably coupled to an opposed end of the front wall 22 of the housing 20. Accordingly, the support arm 40 is selectively movable between a storage or stowed configuration where the support arm 40 is adjacent an exterior surface of the housing front wall 22 (FIG. 1) and an extended configuration when the support arm 40 is extended away from the front wall 22 (FIG. 2). It is understood that the support arm pivots at its first end 42 in order to move between stowed and extended configurations.

The front wall 22 of the housing 20 of the housing 20 may define a recessed area 23 (FIG. 2) having a configuration complementary to a configuration of the support arm 40 such that the support arm 40 is selectively received therein at the stowed configuration (FIG. 1). The support arm 40 includes a top wall 46 having a fastener coupled thereto. Further, the housing 20 includes a ledge 45 upwardly adjacent the recessed area 23 so that the ledge 45 extends outwardly over the recessed area 23. The ledge 45 includes a bottom surface 48 defining a depression 49 (FIG. 2) configured to receive the support arm fastener 47 in a friction fit engagement. In use, the support arm fastener 47 and depression 49 enable the support arm 40 to be selectively maintained at the stowed configuration until a user intentionally applies a mild force urging it toward the extended configuration. The support arm fastener 47 may be a spring plunger that is biased upwardly so as to be normally biased to resist movement of the support arm 40 toward the extended configuration.

The canopy support member 70 is coupled to the support arm 40 and includes a configuration complementary to that of a canopy shaft, the canopy preferably being in the form of an umbrella. More particularly, the canopy support member 70 includes a tubular configuration having a diameter only slightly larger than a diameter of a canopy shaft and having an open upper end 70a. The canopy support member 70 is positioned adjacent the second end 44 of the support arm 40 so that the canopy may be extended away from the housing 20 when the support arm 40 is pivoted to the extended configuration. The canopy support member 70 may include a closed bottom defining a water drain hole 71 so as to simultaneously support a lower end of a canopy shaft and prevent accumulation of rain water.

Figure 9:
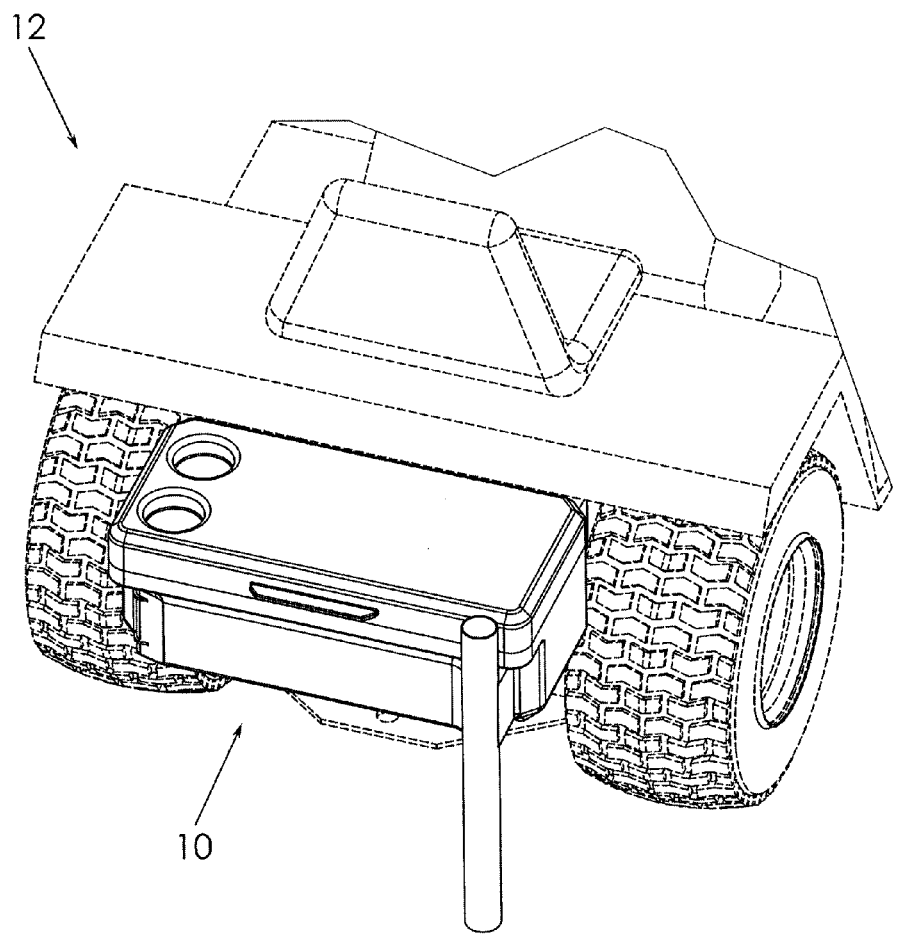
FIG. 9 is a perspective view of the canopy mounting apparatus mounted to the rear framework of a lawn tractor.
Figure 10:
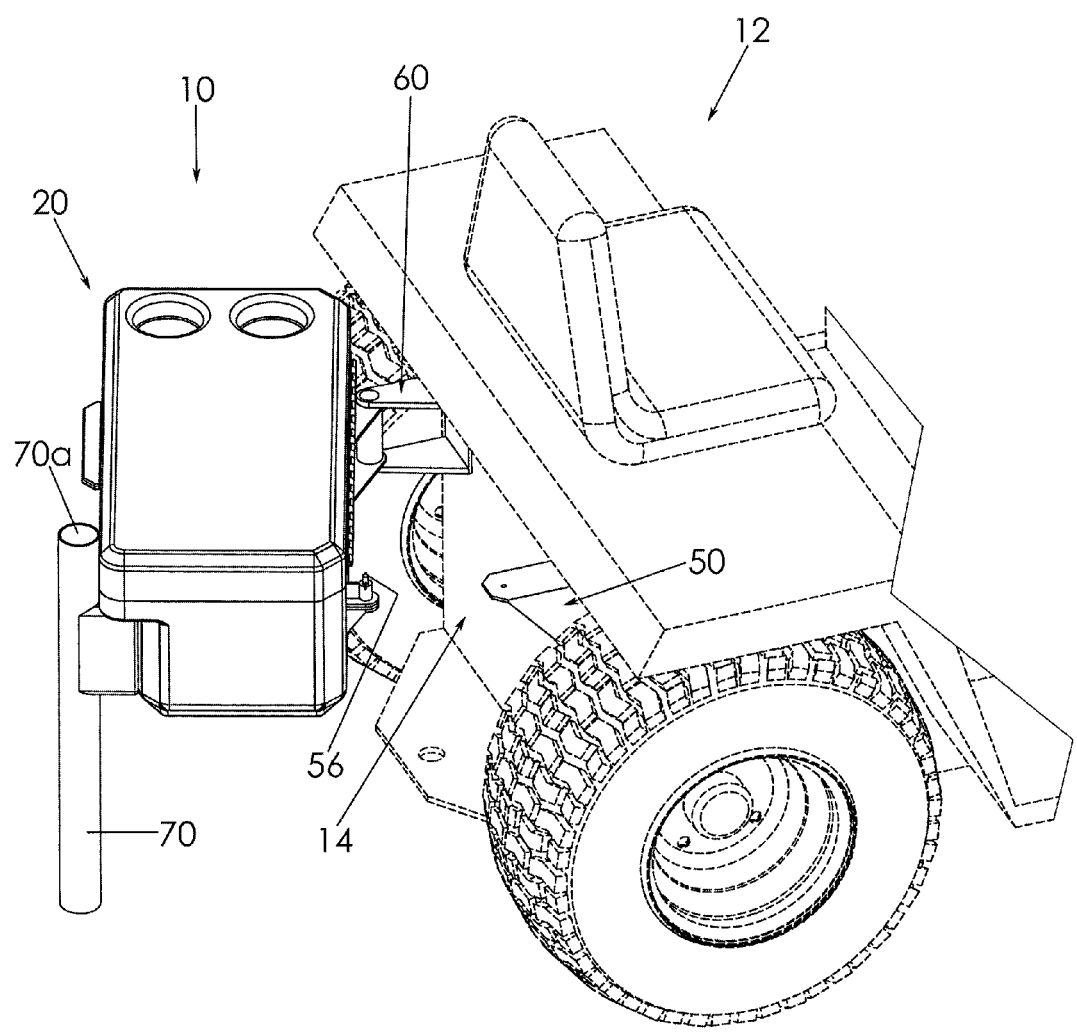
FIG. 10 is a perspective view of the canopy mounting apparatus pivoted away from the lawn tractor.

The housing 20 may be coupled to a rear framework of a lawn tractor 12 (FIG. 9). Specifically, a first bracket 50 includes a first portion 52 mounted to the lawn tractor framework with fasteners such as bolts or the like and a second portion 54 releasably coupled to the rear wall 24 of the housing 20 with a selectably releasable bracket fastener 56 such as, for example, a spring plunger, pin, latch, magnet, or the like. The bracket fastener 56 may also include a handle 58 to aid a user in manipulating the fastener. As shown, the releasable bracket fastener 56 may be mounted to the housing rear wall 24. Further, a second bracket 60 includes a first section 62 that may be mounted to the rear framework of the lawn tractor 12 and a second section 64 mounted to the rear wall 24 of the housing 20. The second section 64 is pivotally connected to the first section 62, such as with a pin, hinge, or the like. Accordingly, the housing 20 may be pivotally extended away from the lawn tractor 12 when the first bracket 50 is released and the second bracket is pivoted (FIG. 10).

In use, the canopy mounting apparatus 10 may be attached to a rear framework of a lawn tractor 12 with the first 50 and second 60 brackets as described above. A canopy (not shown), such as a beach umbrella, may be inserted into the canopy support member 70 so as to provide shade to the lawn tractor 12. If the user desires to change the position of the shaded area, he may urge the support arm 40 from the stowed configuration (FIG. 1) adjacent the front wall 22 of the housing 20 to the extended configuration (FIG. 2). Articles stored in the housing 20 may be accessed by raising the lid 30 to the open configuration (FIG. 2). The canopy may be further extended away from the lawn tractor 12 by releasing the first bracket 50 from connection to the rear wall 24 of the housing 20 and pivoting the housing 20 as described above. Repositioning the housing 20 may also be useful if tools stored therein are being used to work on a workpiece displaced from the lawn tractor 12.

It is understood that while certain forms of this invention have been illustrated and described, it is not limited thereto except insofar as such limitations are included in the following claims and allowable functional equivalents thereof.

The invention claimed is:

1. A canopy mounting apparatus for use on a lawn tractor having a rear framework, said mounting apparatus comprising:

a housing having a bottom wall and a plurality of walls extending upwardly from the bottom wall so as to define an interior area, said plurality of side walls having upper edges defining an open top;

wherein said plurality of walls includes a housing front wall and an opposed housing rear wall with opposed side walls connecting said front and rear walls;

wherein said housing rear wall is configured to be coupled to the lawn tractor rear framework;

a support arm having a first end pivotally coupled to said housing front wall and a second end releasably coupled to said housing front wall, said support arm being movable between a stowed configuration when said support arm is coupled to said housing front wall and an extended configuration when said support arm is extended away from said housing front wall;

a canopy holding member coupled to said support arm, wherein said canopy holding member includes a configuration complementary to a canopy shaft;

a first bracket having a first portion configured to be mounted to the lawn tractor rear framework and a second portion releasably coupled to said housing rear wall; and a second bracket having a first section configured to be mounted to the lawn tractor rear framework and a second section configured to be mounted to said housing rear wall, said first section of said second bracket being pivotally coupled to said second section of said second bracket such that said housing is adapted to be selectively pivoted away from said lawn tractor rear framework when said second portion of said first bracket is released from said housing rear wall;

wherein:
said support arm includes a top wall having a fastener; and
said housing front wall includes a recessed area and a ledge upwardly adjacent said recessed area, said ledge having a bottom surface defining a depression configured to selectively receive said fastener of said support arm, whereby to selectively secure said support arm in said stowed configuration.

2. The canopy mounting apparatus as in claim 1, further comprising a lid pivotally coupled to said housing rear wall and movable between an open configuration allowing access to said interior area and a closed configuration preventing access to said interior area.

3. The canopy mounting apparatus as in claim 2, wherein said lid includes a top surface defining at least one recess configured to receive a beverage receptacle.

4. The canopy mounting apparatus as in claim 1, wherein said recessed area of said housing front wall has a configuration complementary to a configuration of said support arm so as to selectively receive said support arm at said stowed configuration.

5. The canopy mounting apparatus as in claim 4, wherein said canopy holding member is situated adjacent said second end of said support arm so as to be displaced from said housing when said support arm is at said extended configuration.

6. The canopy mounting apparatus as in claim 1, wherein said fastener of said support arm is a spring plunger.

7. The canopy mounting apparatus as in claim 1, further comprising a bracket fastener attached to said housing rear wall, said bracket fastener configured to selectively couple said second portion of said first bracket to said housing rear wall.

8. The canopy mounting apparatus as in claim 7, wherein said bracket fastener is a spring plunger.

9. The canopy mounting apparatus as in claim 8, wherein said spring plunger includes a handle.

10. The canopy mounting apparatus as in claim 1, wherein said canopy holding member includes a closed lower end defining a drainage hole.

\* \* \* \* \*